United States Patent Office 2,890,174
Patented June 9, 1959

2,890,174
XEROGRAPHIC DEVELOPER COMPOSITION

Edward F. Mayer, Cleveland, Ohio, assignor, by mesne assignments, to General Dynamics Corporation, San Diego, Calif., a corporation of Delaware No Drawing. Application February 8, 1955
Serial No. 486,995

2 Claims. (Cl. 252—62.1)

This invention relates to a novel composition of matter which has been found to be particularly useful in the electrostatic development of visual images in electrophotographic processes in which a latent electrostatic image existing as a charge pattern in a layer of a material having a high resistance is converted to a visual image by contact with a finely divided opaque solid.

Known processes in which a latent electrostatic image is formed on such a layer and subsequently converted into a visual image by application of a finely divided opaque solid in the form of a suspension in air of either a dry powder or a liquid mist are described in U.S. Patents Nos. 2,221,776 and 2,297,691. In my copending applications, Serial Nos. 380,285, filed September 15, 1953, and 484,215 filed January 26, 1955, I have disclosed somewhat different electrophotographic processes in which a latent electrostatic image is converted into a visual image by means of a suspension of opaque particles in a liquid.

The present invention is specifically directed to an improved liquid composition to be used in the development of a visual image from the latent electrostatic image produced by either of the aforesaid electrophotographic processes, or any other suitable electrophotographic process.

Essentially, my developer is a combination of ingredients which, when brought into contact with an element bearing an electrostatic charge pattern corresponding to an image to be reproduced, previously referred to as a latent electrostatic image, will deposit by electrostatic attraction a visual light and shadow pattern corresponding to the latent electrostatic image. In its simplest form, the composition comprises three essential ingredients as follows:

(1) A finely divided opaque powder,
(2) A high resistance liquid and
(3) An ingredient which function to prevent agglomeration or clumping of the particles, to control the viscosity of the composition and to minimize settling of the particles.

More particularly my novel composition comprises:
(1) Up to about 25% by weight of a finely divided opaque powder.
(2) Up to about 20% by weight of a suspending agent and
(3) Balance a high resistance liquid vehicle.

Any of the finely divided solid materials conventionally employed in this art may be used in the composition. I prefer to use carbon black, and preferably carbon black in which the particle size has been reduced to colloidal size, for example, 2 microns or less, by ball milling. The particle size chosen for any specific application is necessarily related to the sharpness of definition desired in the ultimate visual image.

Liquids which I have found suitable for the purpose include such organic high resistance liquids as carbon tetrachloride, kerosene, benzene, toluene, or indeed any hydrocarbon or substituted hydrocarbon having a boiling point between about 70° C. and 200° C.

The third component of my novel composition is a material which performs several functions as heretofore noted. I have found that a silica aerogel formed by dehydrating normal silica gel and replacing the water of hydration with air, without destruction of the gel structure is particularly suitable.

The several ingredients may be formed into the desired suspension in various ways. For example the high resistance liquid and the opaque powder may be mixed during the ball milling of the powdered material and the silica aerogel added to the mixture. Alternatively the ingredients may merely be blended by mixing them at one time in a Waring type blender. Once the finely divided powder is dispersed in the high resistance liquid, it may be readily maintained uniformly suspended by occasional hand stirring, since the aerogel functions as a suspending agent in the mixture.

Compositions comprehended within the above description have been found to be particularly useful in the roller electrophotographic process described in my aforesaid copending patent applications. One difficulty encountered in forming the latent electrostatic image into a visual image has been the tendency of the liquid developer heretofore employed to ride up on the developer roll in insufficient amounts and as a result to produce low contrast images. By employing the combination of ingredients herein disclosed I have found that a developer of suitable viscosity results, free from the difficulties previously encountered.

I claim:
1. In a process for converting a latent electrostatic charge image on a high resistance material into a visual image by application thereto of a finely divided opaque solid powder suspended in a liquid hydrocarbon having a high resistance, the improvement consisting of incorporating up to about 20% by weight of silica aerogel to the powder and hydrocarbon suspension prior to the application of said suspension to the charged image on said material, said application of said suspension being adapted to cause said charge image to be rendered visible.

2. A latent electrostatic charge image developer consisting of a liquid hydrocarbon, up to about 25% by weight of colloidal size carbon particles suspended in said liquid hydrocarbon, and up to about 20% by weight of a silica aerogel added to said suspension of said particles in said hydrocarbon.

References Cited in the file of this patent

UNITED STATES PATENTS

| | | |
|---|---|---|
| 2,260,625 | Kistler | Oct. 28, 1941 |
| 2,663,809 | Winslow | Dec. 22, 1953 |